Figure 1:
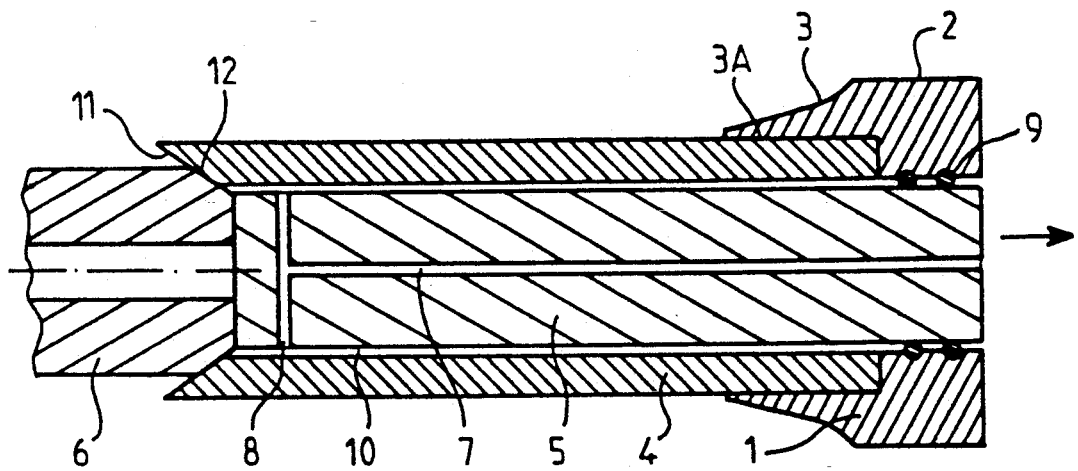

United States Patent [19]
Metivaud et al.

[11] Patent Number: 5,302,338
[45] Date of Patent: Apr. 12, 1994

[54] METHOD FOR HOOPING AND MAINTAINING IN COMPRESSION A CORE BY A SHEATH MADE OF A COMPOSITE MATERIAL

[75] Inventors: Guy Metivaud, Talence; Marcel Auberon, Le Haillan, both of France

[73] Assignee: Aérospatiale Société Nationale Industrielle, Paris, France

[21] Appl. No.: 18,922

[22] Filed: Feb. 18, 1993

Related U.S. Application Data

[63] Continuation of Ser. No. 777,048, Oct. 16, 1991, abandoned.

[30] Foreign Application Priority Data

Oct. 17, 1990 [FR] France ................. 90 12841

[51] Int. Cl.⁵ .............. B29C 31/08; B29C 63/20
[52] U.S. Cl. ...................... 264/516; 264/250;
264/262; 264/570; 29/421.1; 29/424; 29/450;
425/111; 425/112; 425/501
[58] Field of Search ........... 264/262, 266, 510, 516,
264/570, 250; 29/421.1, 424, 450; 425/111, 112,
129.1, 393, 501, 503

[56] References Cited

U.S. PATENT DOCUMENTS

| | | | |
|---|---|---|---|
| 1,457,781 | 6/1923 | Loughead | 29/421.1 |
| 2,090,014 | 8/1937 | Wiltse | 29/450 |
| 2,721,601 | 10/1955 | Spencer | 29/450 |
| 3,269,730 | 8/1966 | Miller et al. | 29/450 |
| 3,613,168 | 10/1971 | Rowland et al. | 264/266 |
| 3,846,901 | 11/1974 | Lovett | 29/450 |
| 4,573,251 | 3/1986 | Hillyard | 29/450 |
| 4,599,783 | 7/1986 | Ceccacci | 29/421.1 |
| 5,046,231 | 9/1991 | Thompson | 29/450 |
| 5,091,027 | 2/1992 | Watanabe | 264/262 |
| 5,114,523 | 5/1992 | Ammon et al. | 29/450 |
| 5,143,573 | 9/1992 | Ammon et al. | 29/450 |

FOREIGN PATENT DOCUMENTS

| | | | |
|---|---|---|---|
| 0212130 | 3/1987 | European Pat. Off. | |
| 0344025 | 11/1989 | European Pat. Off. | |
| 3305541 | 8/1984 | Fed. Rep. of Germany | 264/573 |
| 3821852 | 2/1990 | Fed. Rep. of Germany | |
| 8805618 | of 0000 | France | |
| 2630810 | 11/1989 | France | |
| 7106372 | 11/1971 | Netherlands | 264/516 |
| 177167 | 3/1922 | United Kingdom | 29/450 |
| 1046856 | 10/1966 | United Kingdom | |
| 1313634 | 4/1973 | United Kingdom | |
| 1456619 | 11/1976 | United Kingdom | 29/450 |

OTHER PUBLICATIONS

George S. Brady et al., Materials Handbook, 12th Edition 1986, pp. 688-690.
Andrew Streitwieser, Jr. et al., Introduction to Organic Chemistry, 2nd Edition 1981, pp. 595, 1247.
Patent Abstracts of Japan, vol. 9, No. 25 (M-355) (1748) Feb. 2, 1985 & JP-A-59 171 613 (Hitachi) Sep. 28, 1984.

*Primary Examiner*—Catherine Timm
*Attorney, Agent, or Firm*—Nikaido, Marmelstein, Murray & Oram

[57] ABSTRACT

A method for hooping and maintaining in compression a core by a sheath, with the sheath being made of a composite material and having an internal cross section which is less than an external cross section of the core. The core and the sheath are aligned by centering them with respect to each other, and a prior tensile force is exerted over the core to provide a suitable sealing between the portion in contact of each of the ends of the core and of the sheath. A pressurized fluid is injected into the sheath in a direction of the core, to increase the cross section of the sheath by expanding the sheath in a circumferential direction. The core is thereby gradually inserted into the sheath. When the insertion is complete, fluid injection is ceased and an expendable portion of the sheath is cut off.

6 Claims, 2 Drawing Sheets

METHOD FOR HOOPING AND MAINTAINING IN COMPRESSION A CORE BY A SHEATH MADE OF A COMPOSITE MATERIAL

This application is a continuation of U.S. patent application Ser. No. 777,048 filed Oct. 16, 1991 now abandoned.

The invention relates to a method for hooping and maintaining in compression a core by an outer sheath.

This method is intended for producing devices requiring an outer sheath in order to lock a central core. The outer sheath must then exert a radial pressure on the central core, in order to maintain it in place and, possibly, in order to limit the deformation of the core which may be subjected to forces tending to move the sheath apart.

In particular, the purpose of the invention is a process making it possible to hoop and to maintain in compression a core subjected to significant stresses, it being possible for these stresses to be radial and/or longitudinal and/or circumferential, and therefore requiring adequate properties for withstanding internal pressure (for example of the order of 300 to 1,000 bar), it being possible for the core to have a length which can be up to several meters.

The method according to the invention must therefore make it possible to produce pipework tubes subjected to pressures and/or relatively large internal radial and/or longitudinal and/or circumferential dynamic stresses.

The method according to the invention is also designed in order to be able to hoop a core by means of a sheath in the case where the core and/or the sheath are made from materials having low coefficients of thermal expansion and where the hooping cannot be carried out using a thermal expansion phenomenon.

The method according to the invention is more particularly applicable to the hooping of a core, metallic or not, by means of an outer sheath made of a nonmetallic material, this core and this sheath having arbitrary shapes. This sheath may be more particularly made of a composite material and obtained by filament winding of fibers impregnated with a polymerizable binder material.

Methods for hooping with a composite material are already known, in which a filament winding is produced directly over the object to be hooped. In particular, the French Patent Application filed in the name of the applicant under U.S. Pat. No. 8,805,618, describes a method using the technique of filament winding in order to produce containers for the storing of pressurized fluids. The effectiveness of the hooping only arises when the container is subjected to an internal pressure.

The methods in which a filament winding directly over the object to be hooped is carried out have limitations and drawbacks.

When the composite material producing the hoop is composed of fibers bound by a thermosetting resin, after winding the fibers preimpregnated with resin or even after impregnation of the wound fibers in the dry state, the procedure is to polymerize the composite material. The latter is carried out by raising the temperature in an oven. It is observed that the tension of the fibers, during the winding, must be less than the tensile strength limit of the fibers. In addition, the tension obtained may relax during the polymerization. As a consequence, the residual tension of the fibers may only be very much lower than the tensile strength limit of the fibers. The reinforcement methods in which a filament winding directly over the object to be hooped is carried out therefore may not be suitable for cores subjected to relatively large radial and/or longitudinal and/or circumferential forces and which require corresponding properties for withstanding internal pressure.

On the other hand, it is possible to envisage using this type of method with thermoplastic composite materials, in such a manner as to avoid the polymerization step. In this case, the winding is carried out with fibers impregnated with a heated thermoplastic binder.

It is observed that such a method also has drawbacks.

The bonding of the thermoplastic fibers by heating is obtained progressively from their deposition over the object to be hooped. Consequently, even if it is possible to control the tension of the fibers at the instant of their deposition, it is difficult to adjust the tension of the fibers within the stack of layers. Indeed, the stresses of operating are large and prevent the hoops obtained from being optimized. The optimization would indeed require a very complex calculation as, on the one hand, the first layers of fibers relax in the case of a compressible core, which makes it difficult to control the pressure and, on the other hand, the circulation and the distribution of the resin are difficult to control. This is why the number of layers of fibers produced in order to obtain the desired hoop pressure may be very much more than that required theoretically. Finally, thermoplastic materials are still not widespread and the higher performance ones are very expensive.

A method is known making it possible to lock a substantially cylindrical core able to be subjected to large internal pressures, without producing a filament winding directly over the core. In this method, the core is placed inside an outer sheath which is itself also substantially cylindrical and preferably nonmetallic. The space between the core and the outer sheath is filled with a pressurized fluid. The pressure of the fluid is regulated by means of pistons. The core is thus maintained in place by the pressurized fluid which surrounds it. The outer sheath may be made of a composite material and the pressurized fluid may be a resin, possibly cured, the pressure being maintained during its curing.

This method makes it possible to avoid the drawbacks connected with the production of a direct filament winding, but it has others.

Indeed, in order to maintain relatively long cores in compression and therefore to obtain a good distribution of the fluid along the core, it is necessary to provide quite a large clearance between the outer sheath and the core and/or several points for injection of the pressurized fluid. The presence of a large clearance for the injection of the fluid to which is added the increase in the diameter of the outer sheath under the effect of the internal pressure, leads to relatively large thicknesses of fluid between the sheath and the core. Consequently, a relaxing of the pressure may occur in the case where the pressurized fluid is a resin, because of the creep over time of the resin after polymerization. In addition, if the thickness of resin is too great, a risk of crushing the latter may arise. The need to provide several resin injection points dictates producing a circuit for circulating the fluid between the core and the outer sheath. The presence of this circuit may be a nuisance in certain uses.

A method is also known which makes it possible to maintain in place a core within a metallic outer sheath.

This method consists in inserting, by force, a core into a metallic sheath whose internal diameter is less than the outer diameter of the core. Very large tensile forces must be exerted over the outer sheath. This method is therefore not usable when the outer sheath is made of a composite material. Indeed, the tensile forces exerted would lead to deterioration of the composite material comprising the sheath, by tearing the fibers during the forcible insertion of the core.

Finally, European Patent Application N° 212,130 relates to the hooping of a tubular part by means of a reinforcement cylinder made of a composite material by expanding the reinforcement cylinder and compressing the tubular part by pressurization with the help of a fluid.

The tubular part is inserted into the reinforcement cylinder in the following manner. The pressurized fluid, in particular a liquid, is injected into a mounting housing by means of connecting bores. This fluid reduces the diameter of the tubular part while enlarging the internal diameter of the reinforcement cylinder. As soon as the internal diameter of the reinforcement cylinder is greater than the outer diameter of the tubular part, a control rod is actuated in such a manner that the reinforcement cylinder surrounds the tubular part. After insertion of the tubular part into the reinforcement cylinder, injection of the pressurized fluid is stopped. The tubular part dilates and the diameter of the reinforcement cylinder decreases in such a manner that the latter rests in a fixed manner and with the desired stress over the tubular portion.

The act of expanding the reinforcement cylinder with compression of the tubular part and subsequently effecting the insertion of this tubular part into the reinforcement cylinder requires a very complex apparatus. In order to obtain the action of the pressure over the entire length, this apparatus demands very delicate adjustments which are very difficult to carry out, and, moreover, they are not described in the document.

This solution does not meet the possibility of producing, at a low cost, tubes of long length and, moreover, poses too many operational problems such as, for example, the sealing over a sheath made of a composite material, which does not have very accurate dimensional tolerances. The tooling is very complicated and difficult to produce. In addition, this document does not describe how to solve the problems of sealing during operation of the method. In fact, in this device, there is an incompatibility between the centering, the sealing and the expansion on the basis of the type of embedding chosen, which is connected with the centering. The reduction in diameter of the tubular part at the position of the embeddings over the mounting, as well as the increase in the diameter of the reinforcement cylinder embedded in the mounting, seem particularly delicate and, in any case, they are not well detailed. In fact, if there is sealing, there is centering, and if there is centering, it is not possible to have expansion or shrinkage; therefore it is not seen how the problems of centering, sealing, expansion and contraction may be simultaneously solved.

The object of the invention is to alleviate these drawbacks by proposing a method for hooping and maintaining in compression a core by means of a sheath made of a composite material, making it possible to avoid any slipping of the core in relation to the outer sheath in the presence of relatively large instantaneous stresses, whether these stresses are radial and/or longitudinal and/or circumferential.

According to the invention, the method consists in:
producing the sheath made of a composite material, whose internal cross section, before insertion of the core, is less than the external cross section of the core, aligning the said core and the said sheath by substantially centering them one with respect to the other, exerting a prior tensile force over the said core in such a manner as to provide a suitable sealing between the portions in contact of each of the ends of the core and of the sheath, injecting a pressurized fluid into the said sheath and in the direction of the said core, in order to increase progressively, by being displaced in the axial direction, the cross-section of the sheath and, where appropriate, to reduce the cross-section of the core and simultaneously to continue to exert a tensile force over the said core in such a manner as to insert the said core gradually into the said sheath, stopping the fluid injection after complete insertion of the core into the sheath, cutting off the expendable portion of the sheath held by the end piece.

This method therefore has the advantage of permitting the expansion of the previously produced outer sheath as the core is inserted into the sheath and/or the core is compressed. The method therefore uses the expansion capability of the sheath made of a composite material and/or the compression capability of the core in order to permit the insertion of the core into the sheath. This method therefore makes it possible to hoop and to maintain in compression a core by means of an outer sheath without having to resort to thermal expansion phenomena.

Advantageously, the method consists in addition, before aligning and centering the said sheath and the said core, in producing complementary conical shapes over the portions in contact, one conical shape being on the end of the sheath and one conical shape being on the end of the core, in such a manner that the centering and the suitable sealing between the core and the sheath are carried out by engaging the conical shapes into each other.

The sheath and the external surface of the core may have arbitrary shapes.

In a preferred manner, the internal surface and/or the external surface of the sheath is (are) a surface of revolution. Indeed, when the sheath is a body of revolution, fluid injection causes the expansion of the outer sheath uniformly and the latter is not deformed.

In the present application, the fact that the sheath does not undergo deformation by the injection of pressurized fluid means that at every point the cross section of the sheath before injection of the fluid and that after injection of the fluid are homothetic.

Thus, when the sheath is not a body of revolution, it may turn out to be necessary to maintain the sheath during injection of pressurized fluid, in order to limit its deformation.

The external surface of the core may also be a surface of revolution.

In particular, at least one of these surfaces may be cylindrical. This is especially the case when the sheath and/or the core are tubes.

In particular, at least one of these surfaces may be frustoconical. It is understood that this particular shape facilitates the insertion of the core into the outer sheath.

Preferably, the internal surface of the sheath and the external surface of the core are homothetic. This embodiment is advantageous, as in this case the hoop is produced by the outer sheath itself and not partly by the injected fluid.

This is why, when the internal surface of the sheath and the external surface of the core are not homothetic, it may be advantageous to produce, before aligning the core and the sheath, a covering of the core in such a manner that the internal surface of the sheath and the external surface of the core are homothetic.

Preferably, the pressurized fluid which is injected is a lubricating fluid, in order to facilitate the insertion of the core into the sheath.

It is possible, in particular, to choose as lubricating fluid a polymerizable resin.

In this case, after complete insertion of the core into the sheath and stopping the injection of the pressurized fluid, the method may, in addition, consist in polymerizing the residual resin present between the internal surface of the sheath and the external surface of the core. This additional step of the method makes it possible to provide the bonding of the core over the internal surface of the sheath made of a composite material.

The outer sheath made of a composite material may be obtained by any suitable method. In particular, it is possible to produce it by winding fibers impregnated with polymerizable resin over a support and then polymerizing them.

The sheath comprises at least one layer of wound fibers. However, the thickness of the sheath may be variable. This is advantageous in the case where the core is not subjected to identical internal stresses from one cross-section of the core to another. The core may, for example, be subjected in one particular zone to an internal pressure greater than elsewhere, in which case the outer sheath is produced in such a manner that it has a greater thickness in this zone so as to compensate for this localized overpressure.

For the same purpose, the sheath may be produced from different materials depending on the internal pressure of the corresponding zone of the core.

The fibers used for producing the sheath are organic or mineral fibers having high mechanical strength such as carbon, glass, silica, boron or aramid fibers.

The invention also relates to an apparatus permitting the operation of the method according to the invention.

This apparatus comprises a sliding rod of diameter less than the cross section of the sheath, intended to be connected to the core and to be placed inside the sheath in such a manner that a space is provided between the external surface of the rod and the internal surface of the sheath. The rod is pierced by at least one longitudinal channel and at least one radial channel, the longitudinal channel being in communication with this space by means of the radial channel. This apparatus moreover comprises a system providing the sealing between the sheath and the rod, means for exerting a tensile force on the rod in relation to the sheath and a device generating a pressurized fluid. This latter device is connected to the said longitudinal channel(s) in order to permit the injection of the pressurized fluid into the space between the external surface of the rod and the internal surface of the sheath.

Figure 2:
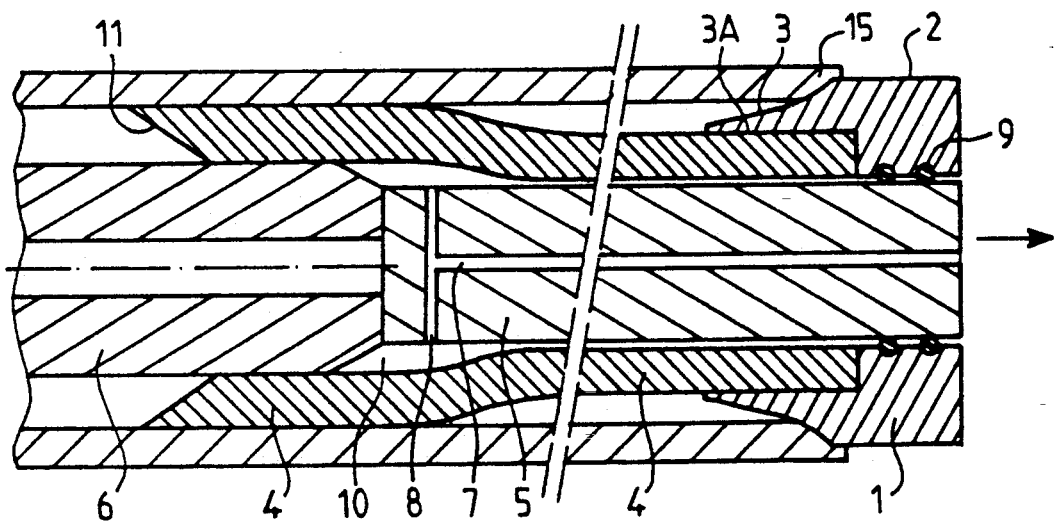
Figure 3:
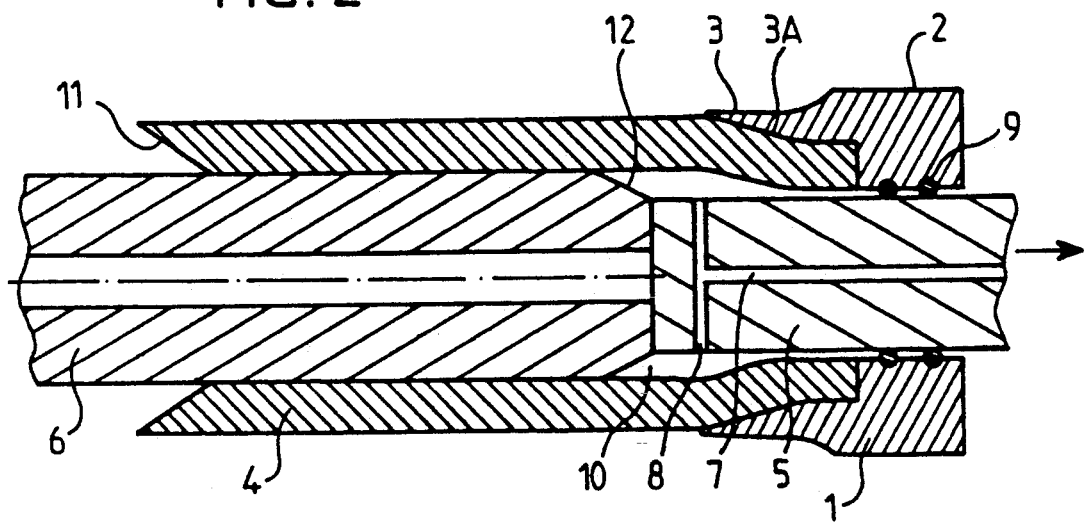
Figure 4:
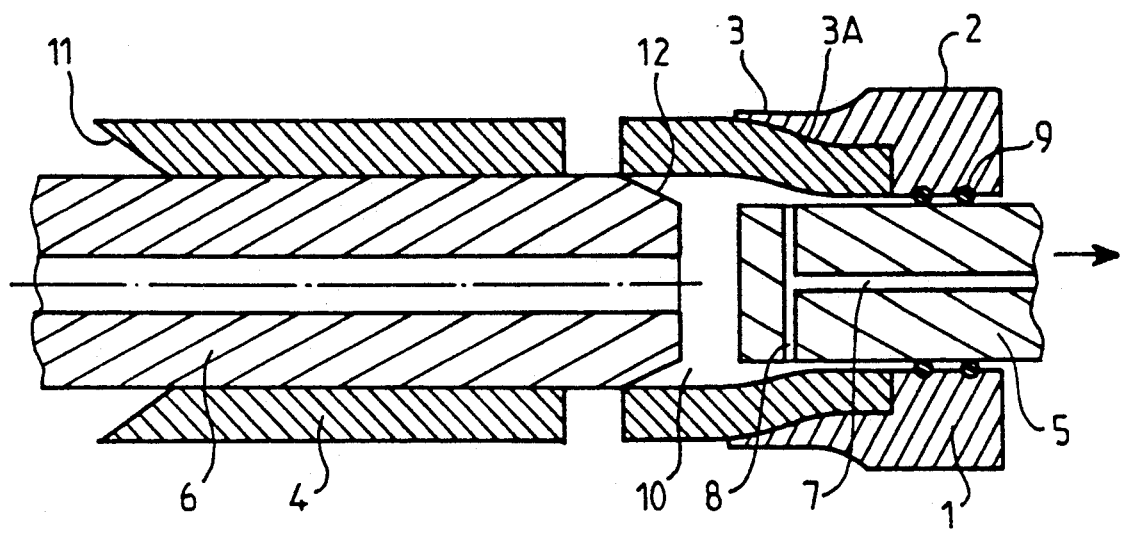
Figure 5:
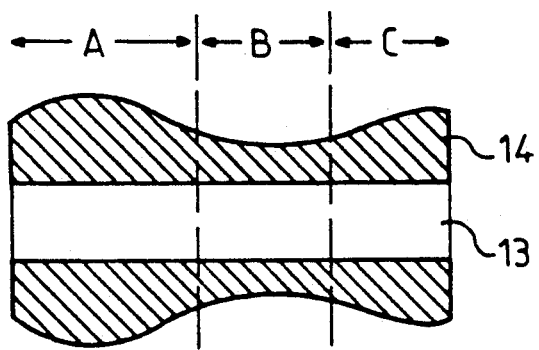

The invention will be better understood and other objectives, advantages and characteristics of the latter will appear more clearly on reading the description of preferred embodiments which follows, with reference to the drawings in which:

FIG. 1 shows an apparatus for the operation of the method according to the invention, a core and an outer sheath, before insertion of the core into the outer sheath, FIG. 2 shows the apparatus, the core and the outer sheath of FIG. 1 during insertion of the core into the outer sheath which is provided with an outer gage-maintaining tube the sheath, FIG. 3 shows a similar view to FIG. 1, at the end of insertion of the core into the outer sheath, FIG. 4 shows a similar view to FIG. 1, the core being completely inserted into the outer sheath, and FIG. 5 shows a particular example of a core by a sheath, conforming to the method according to the invention.

The components common to the various figures will be designated by the same references.

Referring now to FIG. 1, the apparatus permitting the operation of the method according to the invention comprises a first device 1 or basepiece which is hollow and has a generally cylindrical outer shape. This base piece 1 comprises a first portion 2 whose internal surface is substantially cylindrical and a second portion 3 whose internal surface forms a ledge 3A. This ledge 3A enables an outer sheath 4 made of a composite material to be inserted and maintained within the base piece 1.

The apparatus also comprises a rod 5. This rod is substantially cylindrical and its cross-section is less than the internal cross section of the first portion 2 of the end piece 1 and that of the sheath 4 made of a composite material. Thus, a space 10 is provided between the external surface of the sliding rod 5 and the internal surface of the outer sheath 4 and of the basepiece 1.

This rod is intended to be connected to a core 6 which is, for example, metallic and which has to be inserted into the sheath 4 of a composite material in conformance with the method according to the invention. Such connecting means are known to the person skilled in the art and will not be described in detail here.

As shown in FIG. 1, the rod 5 is pierced by at least one longitudinal channel 7 and at least one radial channel 8. The longitudinal channel 7 is in communication with the space 10 by means of the radial channel 8.

This apparatus also comprises a device generating a pressurized fluid. This device is connected to the end of the longitudinal channel 7, which end is located on the side opposite the core, and is not shown in the figures.

The base piece 1 also provides the sealing with the rod 5 by virtue of a system 9 placed at the position of the first portion 2 of the basepiece 1, which may especially consist of seals.

The rod 5 is provided in order to be able to slide on the inside of the sheath 4 and of the basepiece 1. There is therefore provided a device, not shown in the figure, which makes it possible to impart a movement to the rod, substantially in the direction of the axis of the outer sheath 4 and of the base piece 1.

In conformance with the method according to the invention, the outer sheath made of a composite material has been produced beforehand. Numerous methods are known permitting an outer sheath made of a composite material to be obtained.

Reference may especially be made to Patent FR-2,198,817 which relates to a method for obtaining hollow cylindrical bodies. In this method, use is made of a mold having a horizontal axis and rotating at a given speed defining a centrifugal acceleration greater than 1 g. Thus, all materials inserted into the mold by means of devices being displaced axially and longitudinally in the latter are distributed in cylindrical layers coaxial with the mold and with each other. The method therefore consists in forming several different layers which can be composed of thermosetting resin and reinforcing fibers or alternatively of thermosetting resin and an inert material. This method enables hollow cylindrical bodies to be obtained, of which the dimensions of the internal surface are not perfectly controllable. It is therefore usable only in the case where the method according to the invention may be operated with such bodies for an outer sheath. This is especially the case when the core is compressible.

Mention should also be made of the methods using the technique of filament winding. According to this technique, it is possible to form a network of fibers by helically winding over a mandrel individual fibers impregnated with resin. It is also possible to produce a longitudinal and circumferential winding of fibers. In this case, provision may be made for placing at each end of a support-mandrel a ring comprising studs. Fibers may then be continuously wound longitudinally, the returns of the fibers being effected around the studs carried by the rings. Thus, a longitudinal fiber or a sheet of longitudinal fibers is turned around one picot and then, along a short circumferential path, reaches another neighboring picot in order to turn around it itself and to effect a return in order to continue on longitudinally over the mandrel. After such a longitudinal winding, provision may be made for a circumferential winding. Insofar as the wound fibers are preimpregnated with resin, it is sufficient to proceed to polymerization in order to obtain a sheath made of a composite material. As will be seen in more detail in the description hereinbelow, insofar as one of the steps of the process according to the invention consists in radially expanding the outer sheath made of a composite material and this being done progressively in the axial direction, that is to say as the core is inserted into the latter, it is understood that, when the outer sheath is produced from longitudinal and circumferential windings of fibers, it is necessary for the number of layers of circumferentially wound fibers to be not less than the number of layers of longitudinally wound fibers.

Reference may also be made to Patent Application WO 85/04380 relating to devices for storing and transporting pressurized fluid. A composite material is helically wound over the cylindrical portions of these devices. This document also shows that the thickness of the composite material may be variable. This may especially be obtained by controlling the winder appropriately, in such a manner that a greater number of layers of fibers is obtained in specified zones. As will be seen in the description hereinbelow, it may be useful to obtain outer sheaths having variable thicknesses. In this case the technique which has just been described may be advantageously used.

As illustrated in FIG. 1, the outer sheath 4 has a frustoconical shape 11 at one end opposite to that intended for being placed in the ledge 3A of the base piece 1 which is fixed. This frustoconical shape 11 may be obtained by machining the outer sheath, after it has been produced. It may also be obtained directly while producing the sheath, for example by producing a filament winding over a mandrel having, in a specified zone, a frustoconical shape.

In the example shown in FIG. 1, the core also has at one of its ends a frustoconical shape 12. The latter is produced in such a manner as to be complementary with the frustoconical portion 11 of the outer sheath 4.

It is understood that the presence of these complementary frustoconical shapes 11 and 12 facilitates the insertion of the core 6 into the outer sheath 4. These frustoconical shapes are produced on the outer sheath 4 and the core 6 before the sheath and the core are aligned by substantially centering them one with respect to the other, in such a manner that they are in the position illustrated in FIG. 1.

When the outer sheath 4 and the core 6 are in this position, a prior tensile force is exerted on the sliding rod 5, in the direction indicated by the arrow, with the aid of appropriate traction means. Therefore a tensile force is thus exerted on the core 6 in the direction of the sheath 4, in such a manner as to provide a suitable sealing between the portions in contact of each of the ends of the core 6 and of the sheath 4. Whilst this tensile force is maintained, which makes it possible to maintain the frustoconical shapes 11 and 12 in sealed contact one against the other, the device generating a pressurized fluid is actuated appropriately in such a manner that the pressurized fluid is injected into the longitudinal channel(s) 7. By means of the radial channel(s) 8, the pressurized fluid is thus injected into the space 10 provided between the external surface of the sliding rod 5 and the internal surface of the outer sheath 4.

As is illustrated in more detail in FIG. 2, the pressurized fluid injected into the space 10 enables, where appropriate, the external cross-section to be restricted over a zone of the core 6 and the internal cross section to be increased over a corresponding zone of the sheath 4 until it is greater than the external cross-section of the core 6. An appropriate tensile force continues to be exerted on the core 6 in such a manner as to be able to insert the core 6 into the corresponding zone of the sheath 4. Then, the pressurized fluid restricts, where appropriate, the external cross-section of the core 6 over the subsequent zone and increases the internal cross section of the sheath 4 over the corresponding subsequent zone in order to cause the core 6 to penetrate into the zone of the sheath 4. Thus, the pressurized fluid makes it possible to restrict the core 6 and to increase the internal cross section of the sheath 4 as the core 6 is fitted into the sheath 4; that is to say the pressurized fluid acts progressively in the axial direction during the displacement of the core 6. It is understood that the value of the tensile force exerted on the sliding rod should be greater than the value of the forces opposing the penetration of the core into the sheath, these forces resulting especially from the friction of the core over the internal wall of the sheath 4 and from the pressure exerted over the frustoconical portion 12 of the core by the pressurized fluid.

In the example shown in FIG. 1, the outer sheath 4 is made of a composite material and the core 6 is metallic. It is understood therefore that in this particular case, the insertion of the core into the sheath is obtained solely by virtue of the expansion of the sheath made of a composite material.

The method is also applicable to nonmetallic cores and in particular to compressible cores, especially hollow cores. In this case, the injection of pressurized fluid enables the core to be compressed. In addition, it enables the outer sheath to be expanded insofar as the latter is not rigid.

The outer sheath made of a composite material possesses a specified expansion capability. The expansion capability may be adapted depending on the materials used for producing the outer sheath and on the actual production method. In particular, when the outer sheath is obtained by filament winding, it is possible to choose, in an appropriate manner, the type of winding used for each layer and the winding angles.

It has been explained hereinabove that the tensile force exerted on the sliding rod 5 depends on the friction of the core over the internal wall of the sheath 4. So as to reduce the friction forces and consequently the tensile force exerted on the rod, a lubricating fluid may be chosen as the injected fluid. Polymerizable resins may be especially chosen for use.

It may also be noted that the force exerted by the pressurized fluid over the frustoconical shape 12 of the core 6 may be reduced in order to reduce consequently the tensile force exerted on the sliding rod 5. The reduction of this force due to the pressure is obtained by limiting as far as possible the difference between the diameter of the sliding rod 5 and the diameter of the core 6.

After complete insertion of the core into the outer sheath 4 made of a composite material, the device generating the pressurized fluid is actuated, so as to stop the injection of this fluid through the sliding rod 5 in such a manner that the sheath 4, which is no longer subjected to an internal pressure, may cease to be retracted radially around the core 6 by hooping it.

As may be seen in FIG. 4, the procedure then is to cut off the expendable portion of the sheath 4 which is maintained by the base piece 1.

It is understood that a thin film of fluid may persist between the internal surface of the sheath 4 and the core 6. This is why the use of a polymerizable resin as lubricating fluid may be particularly advantageous. Indeed, after complete insertion of the core into the sheath, stopping of the injection of the fluid and complete contraction of the sheath 4, the thin layer of residual resin present between the internal surface of the sheath and the external surface of the core may then be polymerized. Thus the bonding of the core 6 over the internal wall of the sheath 4 is provided. The hooping and the maintaining in compression of the core by means of the sheath made of a composite material are therefore strengthened.

The method according to the invention therefore permits the expansion of the outer sheath and/or the compression of the core. These modifications to the cross section of the sheath and of the core may be quantified in the following manner.

First of all the general case is considered where the method according to the invention permits both the expansion of the sheath and the compression of the core by virtue of an internal pressure $P_1$ prevailing between the external surface of the core and the internal surface of the sheath. In the example of FIGS. 1 and 2, this pressure $P_1$ is the pressure of the fluid in the space 10.

Denoting by:
$O_0$ the internal cross-section of the sheath made of a composite material at rest,
$O'_0$ the internal cross section of the sheath subjected to the internal pressure $P_2$,
$O''_0$ the internal cross section of the hooping of the sheath over the core.

The expansion factor $K_0$ of the sheath is:

$$K_0 = \frac{O'_0 - O_0}{O_0 P_1}$$

Likewise, denoting by:
$O_2$ the external cross section of the core at rest,
$O'_2$ the external cross section of the core subjected to the external pressure $P_1$.
$O''_2$ the external cross-section of the core hooped by the outer sheath.

The compression factor $K_2$ of the core is:

$$K_2 = \frac{O'_2 - O_2}{O_2 P_1}$$

When the sheath is subjected to the pressure $P_1$, the core is inserted if:

$$O'_0 > O'_2$$

There will be hooped of the core by the sheath if:

$$O_2 > O_0$$

After releasing the pressure $P_2$, the internal cross section of the sheath is fixed to the value $O''_2$
where $O''_2 = O''_0$ and exerts a hooping effect on the core.

The sheath made of a composite material will then be maintained in tension and the core will be maintained in compression.

The hooping pressure P at the interface of the core and the outer sheath will be equal to:

$$P = \frac{O_2 - O_0}{(K_0 O_0 - K_2 O_2)}$$

In the particular case where the core is rigid and therefore may not be compressed, the method does not permit the expansion of the outer sheath made of a composite material.

Therefore, under the effect of the pressure $P_2$, it is necessary that $O''_0 > O_2$ and there will be gripping if $O_2 > O_0$.

The core being rigid will mean that $O_2 = O'_2 = O''_2$ and $K_2 = 0$.

Consequently, the pressure at the interface P is equal to $$P = \frac{O_2 - O_0}{K_0 O_0}$$

It is also possible to envisage the particular case where the sheath is rigid and may not be expanded, in which the method permits compression of the core.

Thus, under the pressure $P_2$, it is necessary that $O'_2 < O_0$ and there will be hooping if $O_2 > O_0$.

The sheath being rigid means $O_0 = O'_0 = O''_0$ and because of this, the pressure at the interface of the core and the sheath is equal to $$P = \frac{O_2 - O_0}{-K_2 O_2}$$

In the example shown in FIGS. 1 and 2, the internal surface of the sheath and the external surface of the core are cylindrical. In addition, the thickness of the outer sheath is constant over the entire length of its axis. It is quite certain that the method according to the invention is not only applicable to this type of core and sheath.

This method is completely applicable to a sheath and to a core such that the external surface of the core and/or the internal and/or external surface of the sheath is (are) a surface of revolution. Thus, the internal and/or external surface of the sheath and/or the external surface of the core may be frustoconical. It is understood that in this case, it is not necessary to make the frustoconical shapes over one end of the sheath and of the core. It is also completely possible to hoop and to maintain in compression, in conformance with the method according to the invention, a core having an arbitrary shape by a sheath itself also having an arbitrary shape.

In addition, it may be observed that in the example shown in FIG. 1, the internal surface of the sheath and the external surface of the core are homothetic. The method according to the invention may also be used when these surfaces are not homothetic. It is understood that in this case, the hooping and the maintaining in compression of the core are always provided by the outer sheath, by direct contact of the outer sheath over at least a portion of the periphery of the core.

It may be advantageous to provide the hooping and the maintaining in compression of the core by direct contact of the outer sheath over the entire periphery of the latter. In this case provision may be made, before aligning the core and the sheath, for producing a covering of the core in such a manner that the internal surface of the sheath and the external surface of the covered core are made homothetic.

The sheath 4 may, where appropriate, be maintained with a greater or lesser clearance by means of a gage tube outside the sheath. This maintaining tube 15, shown in FIG. 2, makes it possible, for sheaths of modest thickness, to prevent the problem of the creation of bulges, enlargement or deformations due to an excessive friction from the fitting forces.

The method according to the invention may be operated when the outer sheath is not a body of revolution. In this case, the expansion of the sheath under the effect of the injection of the pressurized fluid is not uniform and deformations may appear. This is why it is advantageous then to maintain the sheath on the outside, during the injection of the pressurized fluid, by means of appropriate devices which will not be described here in more detail, in order to limit the deformation thereof.

By way of example, FIG. 5 shows a cylindrical core 13 hooped and maintained in position by an outer sheath 14 whose internal surface is cylindrical but which has a variable thickness.

As indicated hereinabove, there are known methods enabling, by filament winding, such a sheath made of a composite material to be produced.

This sheath 14 comprises more or less three zones A, B, C, the thickness of the zone A being greater than that of the zone C, itself greater than that of the zone B. The thickness of these zones is chosen in such a manner that the sheath 14 hoops and maintains in compression the core 13 while the latter is subjected to greater stresses in the zone A than in the zone C, the stresses in the zone C themselves being greater than in the zone B.

In the particular case where the core is cylindrical and where the stresses to which it is subjected will be decreasing from one of its ends to the other, use may be especially made of a sheath whose internal surface is cylindrical and whose external surface is frustoconical, the cross section of this external surface decreasing from the end of the core, which end is subjected to the greatest internal stresses, to the other end.

Likewise it is possible to envisage the particular case where the core is frustoconical and where the stresses to which it is subjected will be decreasing from the end having the smallest cross-section to that having the greatest cross-section. It is then possible to use a sheath whose internal surface is frustoconical and whose external surface is cylindrical, the internal surface of the sheath and the external surface of the core being homothetic.

It is understood that it is possible to produce an outer sheath corresponding to the forces to which the core is subjected by adapting its thickness but also by using different materials according to the corresponding zones of the core.

By way of example, the method according to the invention makes it possible to hoop a core with a pressure of approximately 1400 bar, with a sheath made of a composite material dimensioned in order to have a rupture strength of 2000 bar.

Finally, it may be observed that the method according to the invention makes it possible to adjust the hoop pressure with an accuracy of approximately ±10%, it being possible for the maximum value of the hoop pressure to reach 70% of the rupture strength of the sheath made of a composite material.

The sole purpose of the reference symbols inserted after the technical characteristics set forth in the claims is to facilitate the comprehension of the latter and these symbols may not in any way have the effect of limiting the invention to the particular embodiments which have just been described.

We claim:

1. A method for hooping and maintaining a core by a sheath, comprising the steps of:
   providing an elongated core having a homothetic outer peripheral surface and a first end having a frusto-conical shape;
   providing an elongated sheath, said sheath being made of a composite material by winding fibers impregnated with a first polymerizable resin over a support then polymerizing said first polymerizable resin, said sheath having an internal cross section which is less than an external cross section of the core, and having a homothetic circumferential inner peripheral surface, in a shape of a surface of revolution which corresponds to said outer peripheral surface of said core, said sheath also having a first end with a frusto-conical internal shape which corresponds to said frusto-conical shape of said first end of said core;
   providing a base piece for supporting said sheath; said method further comprising the steps of
   holding said sheath in said base piece;
   aligning said first end of said core with first end of said sheath by centering them with respect to each other;

exerting a prior tensile force over said core, in such a manner as to provide a suitable sealing between the portion in contact with each of the first ends of the core and of the sheath;

injecting a pressurized second polymerizable resin into said sheath in a direction of the said core, in order to increase the cross section of the sheath by expanding the sheath in a circumferential direction and, where appropriate, to reduce the cross section of the core and simultaneously to continue to exert a tensile force over the said core, in such a manner as to insert the core gradually into said sheath, wherein a portion of the second polymerizable resin is present between an internal surface of the sheath and an external surface of the core, forming a residual resin portion;

stopping the resin injection after complete insertion of the core into the sheath;

polymerizing the residual resin portion present between the internal surface of the sheath and the external surface of the core;

cutting off an expendable portion of the sheath held by the base piece.

2. Method according to claim 1, wherein at least one of said surfaces is cylindrical.

3. Method according to claim 1, wherein said sheath comprises at least one layer of wound fibers.

4. Method according to claim 1, wherein the thickness of the said sheath is variable.

5. Method according to claim 1, wherein said fibers are organic or mineral fibers having high mechanical strength, selected from the group consisting of carbon, glass, silica, boron, aramid fibers and mixtures thereof.

6. Method according to claim 1, wherein the sheath is equipped with a maintaining tube.

* * * * *